(12) United States Patent
Yang et al.

(10) Patent No.: US 11,064,178 B2
(45) Date of Patent: Jul. 13, 2021

(54) DEEP VIRTUAL STEREO ODOMETRY

(71) Applicant: Artisense Corporation, Palo Alto, CA (US)

(72) Inventors: Nan Yang, Munich (DE); Rui Wang, Munich (DE)

(73) Assignee: Artisense Corporation, Palo Alto, CA (US)

(*) Notice: Subject to any disclaimer, the term of this patent is extended or adjusted under 35 U.S.C. 154(b) by 0 days.

(21) Appl. No.: 16/443,502

(22) Filed: Jun. 17, 2019

(65) Prior Publication Data
US 2019/0387209 A1 Dec. 19, 2019

Related U.S. Application Data

(60) Provisional application No. 62/685,973, filed on Jun. 16, 2018.

(51) Int. Cl.
*H04N 13/128* (2018.01)
*H04N 13/111* (2018.01)
(Continued)

(52) U.S. Cl.
CPC ......... *H04N 13/128* (2018.05); *G06K 9/6256* (2013.01); *G06T 9/002* (2013.01);
(Continued)

(58) Field of Classification Search
CPC .. H04N 13/128; H04N 13/111; H04N 13/271; H04N 13/261; H04N 13/161; H04N 2013/0081; G06T 9/002; G06K 9/6256
See application file for complete search history.

(56) References Cited

U.S. PATENT DOCUMENTS

2017/0018088 A1 1/2017 Jeong et al.
2017/0161901 A1 6/2017 Cansizoglu et al.
(Continued)

FOREIGN PATENT DOCUMENTS

WO 2018037079 3/2018
WO 2018104563 6/2018

OTHER PUBLICATIONS

Wang, Rui, Martin Schworer, and Daniel Cremers. "Stereo DSO: Large-scale direct sparse visual odometry with stereo cameras." Proceedings of the IEEE International Conference on Computer Vision. 2017. (Year: 2017).*

(Continued)

*Primary Examiner* — Tat C Chio
(74) *Attorney, Agent, or Firm* — Kilpatrick Townsend & Stockton LLP

(57) ABSTRACT

A monocular visual odometry system includes a stacked architecture. The stacked architecture receives camera data from a monocular camera and generates a depth map. Additionally, the system includes a deep virtual stereo odometry module that receives the camera data from the monocular camera and the depth map from the stacked architecture. The calculation module initializes a keyframe of the camera data using the depth map and determines a photometric error based on a set of observation points extracted from the keyframe and a set of reference points extracted from the camera data. The calculation module determines a virtual stereo photometric term using the depth map. The calculation module also optimizes a total energy function that includes the photometric error and the virtual stereo photometric term. Using the total energy function, the calculation module generates a positional parameter of the system and provides the positional parameter to an autonomous system.

20 Claims, 7 Drawing Sheets

(51) Int. Cl.
  *H04N 13/271* (2018.01)
  *G06T 9/00* (2006.01)
  *H04N 13/261* (2018.01)
  *G06K 9/62* (2006.01)
  *H04N 13/161* (2018.01)
  *H04N 13/00* (2018.01)

(52) U.S. Cl.
  CPC ......... *H04N 13/111* (2018.05); *H04N 13/161* (2018.05); *H04N 13/261* (2018.05); *H04N 13/271* (2018.05); *H04N 2013/0081* (2013.01)

(56) References Cited

U.S. PATENT DOCUMENTS

2019/0295282 A1* 9/2019 Smolyanskiy ........ G01S 13/931
2020/0098135 A1* 3/2020 Ganjineh ............... G01C 21/32

OTHER PUBLICATIONS

Application No. PCT/US2019/037490, International Search Report and Written Opinion, dated Sep. 3, 2019, 8 pages.
Application No. PCT/US2019/037490, International Preliminary Report on Patentability, dated Dec. 30, 2020, 7 pages.

\* cited by examiner

DEEP VIRTUAL STEREO ODOMETRY

RELATED APPLICATIONS

The present application claims priority to U.S. Provisional Application No. 62/685,973 for "Deep Virtual Stereo Odometry" filed Jun. 16, 2018, which is incorporated by reference herein in its entirety.

TECHNICAL FIELD

This disclosure relates generally to the field of robotics, and more specifically relates to monocular visual odometry used to accurately determine position and orientation of an object on which a camera of a monocular visual odometry system is rigidly mounted.

BACKGROUND

Visual odometry systems are used by a wide variety of autonomous systems, including robotic devices, self-driving cars, security monitoring systems, augmented reality/virtual reality (AR/VR) systems, and other autonomous systems. In some cases, the autonomous system may drive or fly in an environment, pick up objects, or perform other interactions based on information from the visual odometry system. A visual odometry system may provide an important interface between an autonomous system and the surrounding world, enabling the autonomous system to interpret and react to objects around it. In some cases, a reliable and accurate visual odometry system may improve operation of an autonomous system, such as by improving navigational accuracy or reducing collisions.

Based on information provided by a visual odometry system, an autonomous system may perform environment interactions based on an estimated location of the autonomous system in the environment. In some cases, a visual odometry system provides the estimated location based on a scale of the environment, such as a scale indicating if a particular object is small and nearby, or large and farther away. A visual odometry system that is configured to provide high-accuracy estimations of scale or location may allow the autonomous system to avoid performing actions that could harm humans or cause property damage. However, visual odometry systems may rely on high cost active depth cameras or stereo camera systems to provide acceptable scale and location estimations at the visual odometry system. Such visual odometry systems may also require sensitive calibration tuning, which is also expensive and time consuming. Further, monocular visual odometry systems relying on a single camera using geometric approaches inherently suffer from camera trajectories and maps that can only be estimated up to an unknown scale. This leads to scale drift and inaccuracies in the visual odometry system.

SUMMARY

According to certain implementations, a monocular visual odometry system may perform a visual odometry process by leveraging a deep monocular depth prediction into direct sparse odometry (DSO) as direct virtual stereo measurements. For example, a monocular visual odometry system includes a stacked architecture module that receives camera frame data from a monocular camera sensor and generates a depth map of the camera frame data. The monocular visual odometry system also includes a deep virtual stereo odometry calculation module. The deep virtual stereo odometry calculation module receives the camera frame data from the monocular camera sensor and the depth map from the stacked architecture module and initializes a keyframe of the camera frame data using the depth map of the camera frame data. Further, the deep virtual stereo odometry calculation module determines a photometric error based on a set of observation points extracted from the keyframe and a set of reference points extracted from a set of reference camera frames of the camera frame data. Furthermore, the deep virtual stereo odometry calculation module determines a virtual stereo photometric term using the depth map of the camera frame data and optimizes a total photometric energy function comprising the photometric error and the virtual stereo photometric term. Upon optimizing the total photometric energy function, the deep virtual stereo odometry calculation module generates a positional parameter of the monocular visual odometry system using the total photometric energy function and provides the positional parameter to an autonomous system.

In another example, a method includes receiving camera frame data from a monocular camera sensor and generating a depth map of the camera frame data. Further, the method includes initializing a keyframe of the camera frame data using the depth map of the camera frame data. Furthermore, the method includes determining a photometric error based on a set of observation points extracted from the keyframe and a set of reference points extracted from a set of reference camera frames of the camera frame data. Additionally, the method includes determining a virtual stereo photometric term using the depth map of the camera frame data and optimizing a total photometric energy function including the photometric error and the virtual stereo photometric term. Moreover, the method includes generating a positional parameter of the monocular camera sensor using the total photometric energy function and providing the positional parameter to an autonomous system.

In another example, a non-transitory computer-readable medium embodying program code for operating a monocular visual odometry system is provided. The program code includes instructions which, when executed by a processor, cause the processor to perform operations. The operations include receiving camera frame data from a monocular camera sensor and generating a depth map of the camera frame data. Further, the operations include initializing a keyframe of the camera frame data using the depth map of the camera frame data. Furthermore, the operations include determining a photometric error based on a set of observation points extracted from the keyframe and a set of reference points extracted from a set of reference camera frames of the camera frame data. Additionally, the operations include determining a virtual stereo photometric term using the depth map of the camera frame data and optimizing a total photometric energy function including the photometric error and the virtual stereo photometric term. Moreover, the operations include generating a positional parameter of the monocular camera sensor using the total photometric energy function and providing the positional parameter to an autonomous system.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
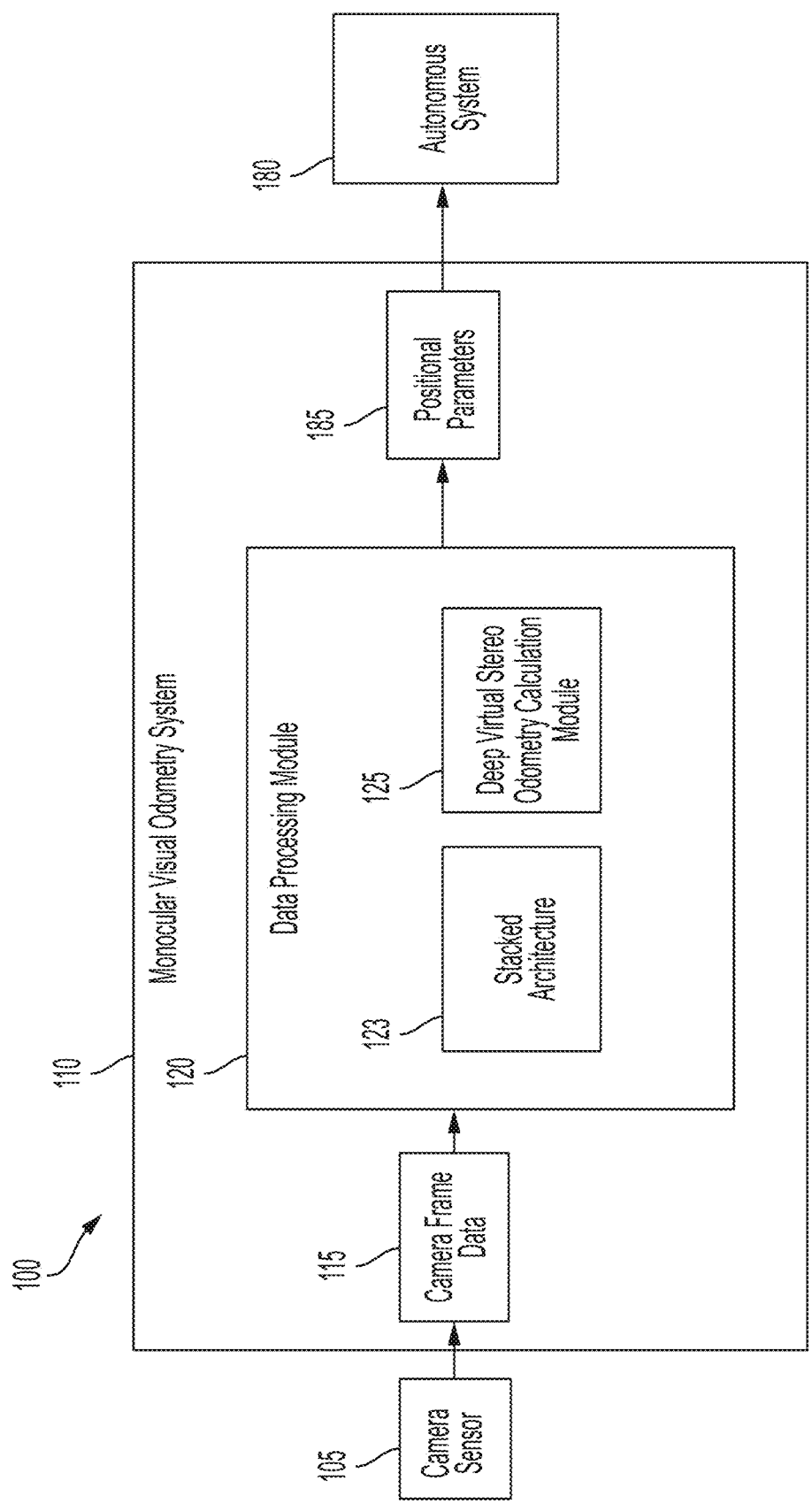
FIG. 1 is a diagram depicting an example of a monocular visual odometry system, according to certain implementations.

Certain implementations described herein provide for a monocular visual odometry system that accurately performs depth predictions for an environment surrounding the monocular visual odometry system from a single image source. The monocular visual odometry system may perform rapid depth estimations based on a deep network that refines predicted depth from a single image in a two-stage process. In some instances, the deep network is trained in a semi-supervised way using photoconsistency in stereo images and using consistency with accurate sparse depth reconstructions from stereo direct sparse odometry (stereo DSO). The depth estimations generated from the deep network may achieve accurate results without scale drifting using only the single camera of the monocular visual odometry system.

In an example, depth of objects may be estimated from a single image generated by the single camera of the monocular visual odometry system when known information about typical sizes or appearances of objects is used by the monocular visual odometry system. A deep learning based approach provides the depth estimates by training deep neural networks on large amounts of data. A deep virtual stereo odometry technique described herein is able to incorporate the deep depth predictions with a monocular odometry pipeline to generate accurate depth estimations. Further, deep virtual stereo disparity for virtual direct image alignment constraints may be used within a framework for windowed direct bundle adjustment (e.g., direct sparse odometry).

Additionally, a stacked residual network architecture may be implemented that refines disparity estimates in two stages and is trained in a semi-supervised manner. For example, stereo direct sparse odometry (stereo DSO) is used by the monocular visual odometry system to obtain a sparse depth ground-truth for the semi-supervised training. Using semi-supervised deep learning with the stacked residual network architecture, the monocular visual odometry system is able to provide accurate sparse three-dimensional reconstructions on a set of data (e.g., an estimated depth map).

The estimated depth map may be used in a visual odometry system to provide a position and orientation information of the individual camera. This information may be provided to an automated system, such as a self-driving vehicle, an aerial drone, a scientific probe, augmented reality/virtual reality (AR/VR) systems, or any suitable automated system that is able to operate without human interactions. The automated system may interact with its surroundings based on the operational parameters. Based on the higher accuracy information provided by the depth map, the automated system may improve interactions with the surrounding environment. An automated system that can improve interactions with the environment may operate with improved efficiency and reliability.

In addition, a monocular visual odometry system that is capable of accurately providing a scale estimation may reduce the use of computing resources (e.g., processing power, memory) associated with a stereo visual odometry system. The monocular visual odometry system that provides an accurate scale estimation based on reduced computing resources may provide additional benefits for automated systems, such as lighter-weight computing components for autonomous aerial vehicles (e.g., drones) or lower energy consumption for battery-operated devices (e.g., long-term scientific probes for interplanetary or underwater exploration).

In some implementations, a monocular visual odometry system determines pose data that describes the position and orientation of the individual camera of the monocular visual odometry system relative to the surrounding environment. For example, a monocular visual odometry system may receive camera data. The camera data may include images of the surroundings of the monocular visual odometry system. Based on the camera data, the monocular visual odometry system may use a depth estimation from a trained deep learning network to determine pose data of the individual camera. The pose data may indicate the position and orientation of the monocular visual odometry system based at least on visual data, such as a pose determined based on image points (e.g., points visible in an image) that are detected in the camera data. In some cases, the monocular visual odometry system generates (or modifies) parameters for an autonomous system based on the pose data, such as parameters describing the autonomous system's position, orientation, distance to surrounding objects, scale of surrounding objects, or any other parameter related to navigation or operation of the autonomous system.

Referring now to the drawings, FIG. 1 depicts an example of a computing system 100 in which a monocular visual odometry system 110 is implemented. For instance, the computing system 100 may be included in (or configured to communicate with) an autonomous system, such as an autonomous or semi-autonomous vehicle that may navigate a surrounding environment. In some cases, the computing system 100 may be included in or communicate with a virtual autonomous system, such as a computer-implemented simulation of an autonomous system. The computing system 100 may include, for example, one or more processors or memory devices that perform operations that are described herein. In addition, the computing system 100 may include (or be able to communicate with) one or more input devices or output devices that exchange information with a user, another computing system, or the surrounding environment. Input devices may provide information to the computing system 100, including input devices such as sensors (e.g., camera, accelerometer, microphone), a keyboard, a mouse, a control device (e.g., a steering wheel), or other suitable input devices. Output devices may be configured to receive information from the computing system 100, including output devices such as maneuvering devices (e.g., wheels, rotors, steering devices), alerts (e.g., lights, alarms) a display device, or other suitable output devices.

The computing system 100 includes the monocular visual odometry system 110 and one or more sensors, such as a camera sensor 105. The camera sensor 105 may provide visual data, such as digital images representing the surrounding environment of the monocular visual odometry system 110. The visual data may include black-and-white, color, or greyscale images; still images or video sequences of images; photographic images, line images, or point-based images; or any other suitable type of visual data. In an example, the camera sensor 105 is a monocular camera.

In some implementations, the monocular visual odometry system 110 may receive data from the camera sensor 105, such as camera frame data 115. For example, the camera frame data 115 may include one or more camera frames that are recorded by the camera sensor 105. Each camera frame may include an image of the surroundings of the monocular visual odometry system 110, such as images of buildings, people, road markings, or other objects in the surrounding environment. In addition, each camera frame may include (or correspond to) a time, such as a timestamp indicating when the image was recorded by the camera sensor 105.

The monocular visual odometry system 110 may include a data processing module 120. The data processing module 120 may be configured to determine pose data that describes a position and orientation of the visual odometry system 110 relative to the surrounding environment. For example, the data processing module 120 may implement a stacked architecture 123 to identify an estimated depth map from the camera frame data 115. The depth map generated by the stacked architecture 123 may be used in conjunction with a deep virtual stereo odometry calculation module 125 to generate information describing a pose of the monocular visual odometry system 110, such as a set of image points (e.g., extracted from one or more camera images) that indicate shapes, edges, or other visual features of the surrounding environment.

The estimated pose data may be calculated based on available data describing the monocular visual odometry system 110 or the environment, such as the camera frame data 115. In some cases, the data processing module 120 may determine the estimated data based on data that is not included in the camera frame data 115. For example, before or during an initialization period of the monocular visual odometry system 110, the estimated pose data may be calculated based on an initialized estimation of position of the monocular visual odometry system 110. The initialized estimates may be based on an interaction of the camera frame data 115 with the stacked architecture 123.

The data processing module 120 may optimize the pose data for the monocular visual odometry system 110 based on received data. Based on analysis of the camera frame data 115, for example by the stacked architecture 123 and the deep virtual stereo odometry calculation module 125, the data processing module 120 may determine an adjustment for the estimated pose. In some cases, the adjustment indicates a change of the monocular visual odometry system 110's estimated position or orientation (or both). The data processing module 120 may generate optimized pose data based on the determined adjustment. In some cases, the optimized pose data may adjust pose data describing the position and orientation of the visual odometry system 110, such as by correcting the pose data to have a value that is closer to the actual position and orientation in the environment. In some cases, the data processing module 120 optimizes the pose data in an ongoing manner.

Based on the deep virtual stereo odometry calculation module 125, the monocular visual odometry system 110 may generate or modify one or more positional parameters 185. The positional parameters 185 may describe the pose of the monocular visual odometry system 110, such as a position in a coordinate system or an angle of orientation. In some cases, the monocular visual odometry system 110 is configured to provide the positional parameters 185 to an autonomous system 180. The autonomous system 180 may perform one or more operations based on the positional parameters 185, such as operations related to navigation, vehicular motion, collision avoidance, or other suitable operations.

In some cases, optimizing pose data that is used by an autonomous system improves the capabilities of the autonomous system to interact with its environment. For example, optimization of pose data, including continuous or periodic optimization, may enable the autonomous system 180 to determine correct navigational headings, adjust velocity, estimate a correct distance to an object, or perform other adjustments to its own operations. In some cases, adjusting operations based on the optimized pose data may improve accuracy and reliability of the autonomous system's activities.

Figure 2:
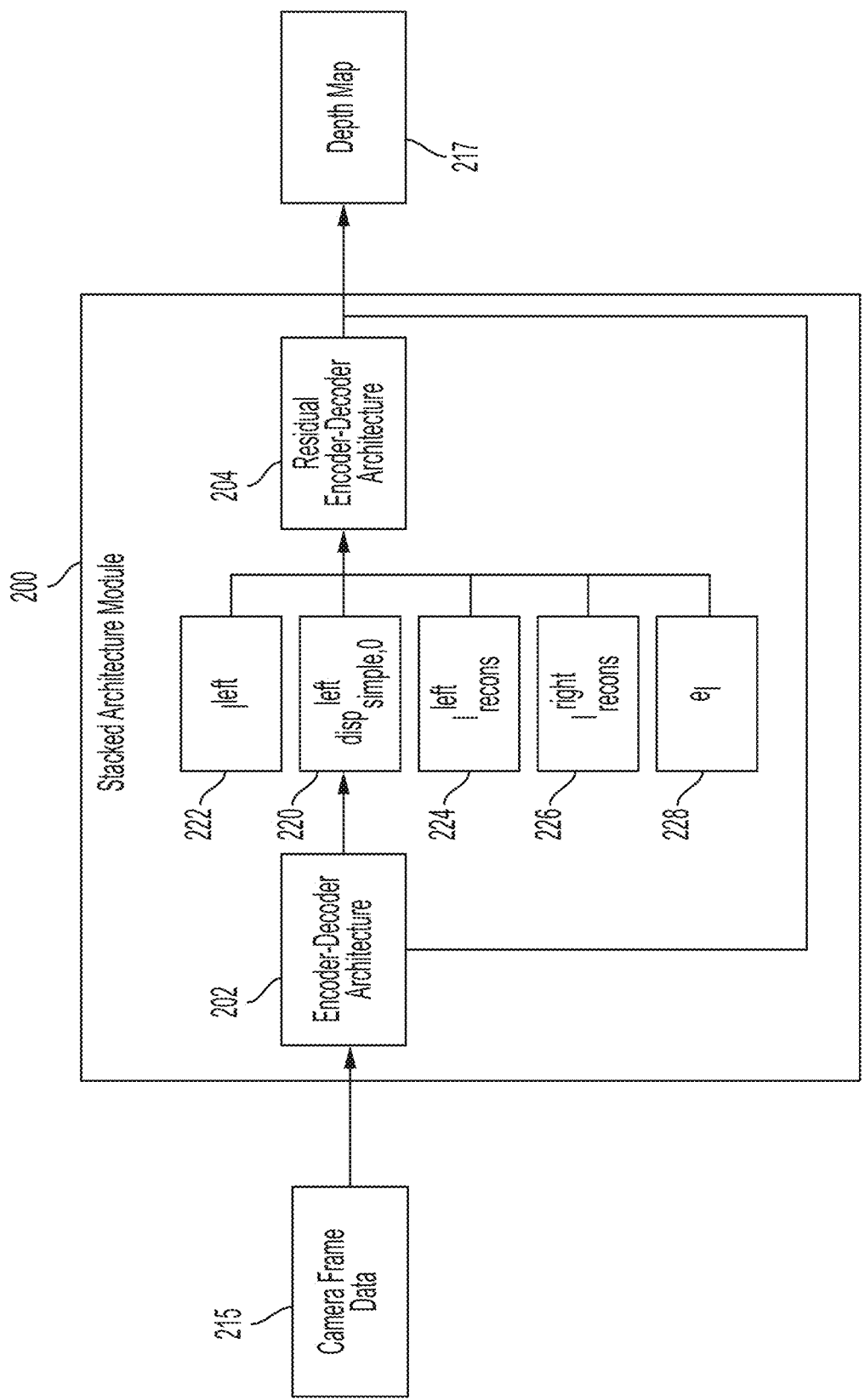
FIG. 2 is a diagram depicting an example of a stacked architecture module including an encoder-decoder architecture and a residual encoder-decoder architecture, according to certain implementations.

FIG. 2 depicts an example of a stacked architecture module 200 including an encoder-decoder architecture 202 and a residual encoder-decoder architecture 204. The stacked architecture module 200 may be included in a monocular visual odometry system, such as the monocular visual odometry system 110 described above with regard to FIG. 1. In addition, the stacked architecture module 200 may receive data (e.g., as described above with regard to FIG. 1), such as camera frame data 215 received by the camera sensor 105. In some cases, the camera frame data 215 may include images generated by the camera sensor 105. Based on the received data, the stacked architecture module 200 may generate a depth map 217 of the images generated by the camera sensor 105. For example, the stacked architecture module 200 may modify the camera frame data 215 by adding a depth element to generate the depth map 217.

In one or more examples, the encoder-decoder architecture 202 and the residual encoder-decoder architecture 204 are fully convolutional deep neural networks. The residual encoder-decoder architecture 204 includes fewer layers and receives an output from the encoder-decoder architecture 202 as an input. The residual encoder-decoder architecture 204 may refine disparity maps predicted by the encoder-decoder architecture 202 by learning an additive residual signal.

The encoder-decoder architecture 202 may include a ResNet-50 based encoder and skip-connections between corresponding encoder and decoder layers. A decoder of the encoder-decoder architecture 202 upprojects feature maps to an original resolution and generates a pair of disparity maps $dis_{simple,s}^{left}$ $disp_{simple,s}^{right}$ for each resolution s (e.g., where s∈[0,3]). In an example, the upprojection is implemented by a resize-convolution (e.g., a nearest-neighbor upsampling layer by a factor of two followed by a convolutional layer). The usage of skip-connections may enable the decoder to recover high-resolution results with fine-grained details.

As illustrated, the encoder-decoder architecture 202 outputs a left disparity map 220 at a resolution of 0 (i.e., $disp_{simple,0}^{left}$). The left disparity map 220 is fed into the residual encoder-decoder architecture 204 along with an original image 222 (i.e., $I^{left}$), a left reconstructed image 224

(i.e., $I_{recons}^{left}$) a right reconstructed image 226 (i.e., $I_{recons}^{right}$), and a reconstruction error 228 (i.e., $e_l$), which represents a reconstruction error between the original image 222 and the left reconstructed image 224. The residual encoder-decoder architecture 204 further refines the disparity maps predicted by the encoder-decoder architecture 202. For example, the residual encoder-decoder architecture 204 learns residual signals (i.e., $disp_{res,s}$) to the disparity maps (i.e., $disp_{simple,s}$) predicted by the encoder-decoder architecture 202 for both left and right images for all resolutions.

In an example, the right reconstructed image 226 is generated by warping the original image 222 using a right disparity map generated for a resolution s of 0 at the encoder-decoder architecture 202 (i.e., $disp_{simple,0}^{right}$) Further, the left reconstructed image 224 is generated by back-warping the right reconstructed image 226 using a left disparity map generated for a resolution s of 0 at the encoder-decoder architecture 202 (i.e., $disp_{simple,0}^{left}$) The residual encoder-decoder architecture 204 outputs a pair of residual disparity maps $disp_{res,s}^{left}$ and $disp_{res,s}^{right}$ for each resolution s (e.g., where $s \in [0,3]$).

The outputs of both the encoder-decoder architecture 202 and the residual encoder-decoder architecture 204 are combined with element-wise summation to generate the depth map 217. In an example, the depth map 217 may be represented with the following equation:

$$disp_s = disp_{simple,s} \oplus disp_{res,s} \quad s \in [0,3] \quad \text{(Equation 1)}$$

where $disp_s$ represents the depth map 217.

For each resolution s of the depth map 217, a loss $\mathcal{L}_s$ at each output scale s may be defined. For example, a total loss L is represented by the following equation:

$$\mathcal{L} = \Sigma_{s=0}^{3} \mathcal{L}_s \quad \text{(Equation 2)}$$

The loss at each resolution may be a linear combination of five terms that are symmetric in left and right images. For example, the loss at each resolution may be represented by the following equation:

$$\mathcal{L}_s = \alpha_U(\mathcal{L}_U^{left} + \mathcal{L}_U^{right}) + \alpha_S(\mathcal{L}_S^{left} + \mathcal{L}_S^{right}) + \alpha_{lr}(\mathcal{L}_{lr}^{left} + \mathcal{L}_{lr}^{right}) \alpha_{smooth}(\mathcal{L}_{smooth}^{left} + \mathcal{L}_{smooth}^{right}) + \alpha_{occ}(\mathcal{L}_{occ}^{left} + \mathcal{L}_{occ}^{right}) \quad \text{(Equation 3)}$$

where $\mathcal{L}_U$ is a self-supervised loss, $\mathcal{L}_S$ is a supervised loss, $\mathcal{L}_{lr}$ is a left-right consistency loss, $\mathcal{L}_{smooth}$ is a smoothness term encouraging predicted disparities to be locally smooth, and $\mathcal{L}_{occ}$ is an occlusion regularization term. The encoder-decoder architecture 202 and the residual encoder-decoder architecture 204 may be trained using training data to minimize the total loss $\mathcal{L}$. The training of the encoder-decoder architecture 202 and the residual encoder-decoder architecture 204 may be performed in a semi-supervised manner. For example, the encoder-decoder architecture 202 and the residual encoder-decoder architecture 204 may be trained by combining self-supervised and supervised training methods with relying on costly collection of LiDAR ground-truth data. Instead, stereo direct sparse odometry is used to provide accurate sparse three-dimensional reconstructions of information in the training data.

The self-supervised loss term measures the quality of the reconstructed images. As mentioned above, the reconstructed image is generated by warping the input image into a view of a rectified stereo image. The quality of the reconstructed image is measured with a combination of an $l_i$ loss and single scale structural similarity (SSIM). The self-supervised loss may be represented by the following equation:

$$\mathcal{L}_U^{left} = \frac{1}{N}\sum_{x,y} \alpha \frac{1 - SSIM(I^{left}(x,y), I_{recons}^{left}(x,y))}{2} + (1-\alpha)\|I^{left}(x,y) - I_{recons}^{left}(x,y)\|_1 \quad \text{(Equation 4)}$$

The supervised loss term measures the deviation of the predicted disparity map from the disparities estimated by stereo direct sparse odometry at a sparse set of pixels. The supervised loss may be represented by the following equation:

$$\mathcal{L}_S^{left} = \frac{1}{N}\sum_{(x,y) \in \Omega_{DSO,left}} \beta_\in (disp^{left}(x,y) - disp_{DSO}^{left}(x,y)) \quad \text{(Equation 5)}$$

where $\Omega_{DSO,left}$ is a set of pixels with disparities estimated by direct sparse odometry and $\beta_\in(x)$ is a reverse Huber (berHu) norm, which lets training of the stacked architecture module 200 focus on larger residuals. A threshold E may be adaptively set as a batch-dependent value represented by the following equation:

$$\in = 0.2 \max_{(x,y) \in \Omega_{DSO,left}} |disp^{left}(x,y) - disp_{DSO}^{left}(x,y)| \quad \text{(Equation 6)}$$

Given only a left image as input, the monocular visual odometry system 110 predicts a disparity map of both the left image and the right image. Consistency between the left and right disparity image is provided by the left-right disparity consistency loss term. The following equation may represent the left-right disparity consistency loss:

$$\mathcal{L}_{lr}^{left} = \frac{1}{N}\sum_{(x,y)} |disp^{left}(x,y) - disp^{right}(x - disp^{left}(x,y), y)| \quad \text{(Equation 7)}$$

The disparity smoothness regularization term assumes that a predicted disparity map should be locally smooth. A second-order smoothness prior is used and downweighted when an image gradient is high. The following equation may represent the disparity smoothness regularization:

$$\mathcal{L}_{lr}^{left} = \frac{1}{N}\sum_{(x,y)} |\nabla_x^2 disp^{left}(x,y)|e^{-\|\nabla_x^2 I^{left}(x,y)\|} + |\nabla_y^2 disp^{left}(x,y)|e^{-\|\nabla_y^2 I^{left}(x,y)\|} \quad \text{(Equation 8)}$$

The disparity smoothness regularization tends to generate a shadow area where values gradually change from foreground to background due to stereo occlusion. To favor background depths and hard transitions at occlusions, the occlusion regularization term is imposed to penalize a total sum of absolute disparities. A combination of smoothness and occlusion regularization prefers to directly take a smaller, close-by background disparity that better corresponds to an assumption that a background area is uncovered. The occlusion regularization may be represented by the following equation:

$$\mathcal{L}_{occ}^{left} = \frac{1}{N}\sum_{(x,y)} |disp^{left}(x,y)| \quad \text{(Equation 9)}$$

Figure 3:
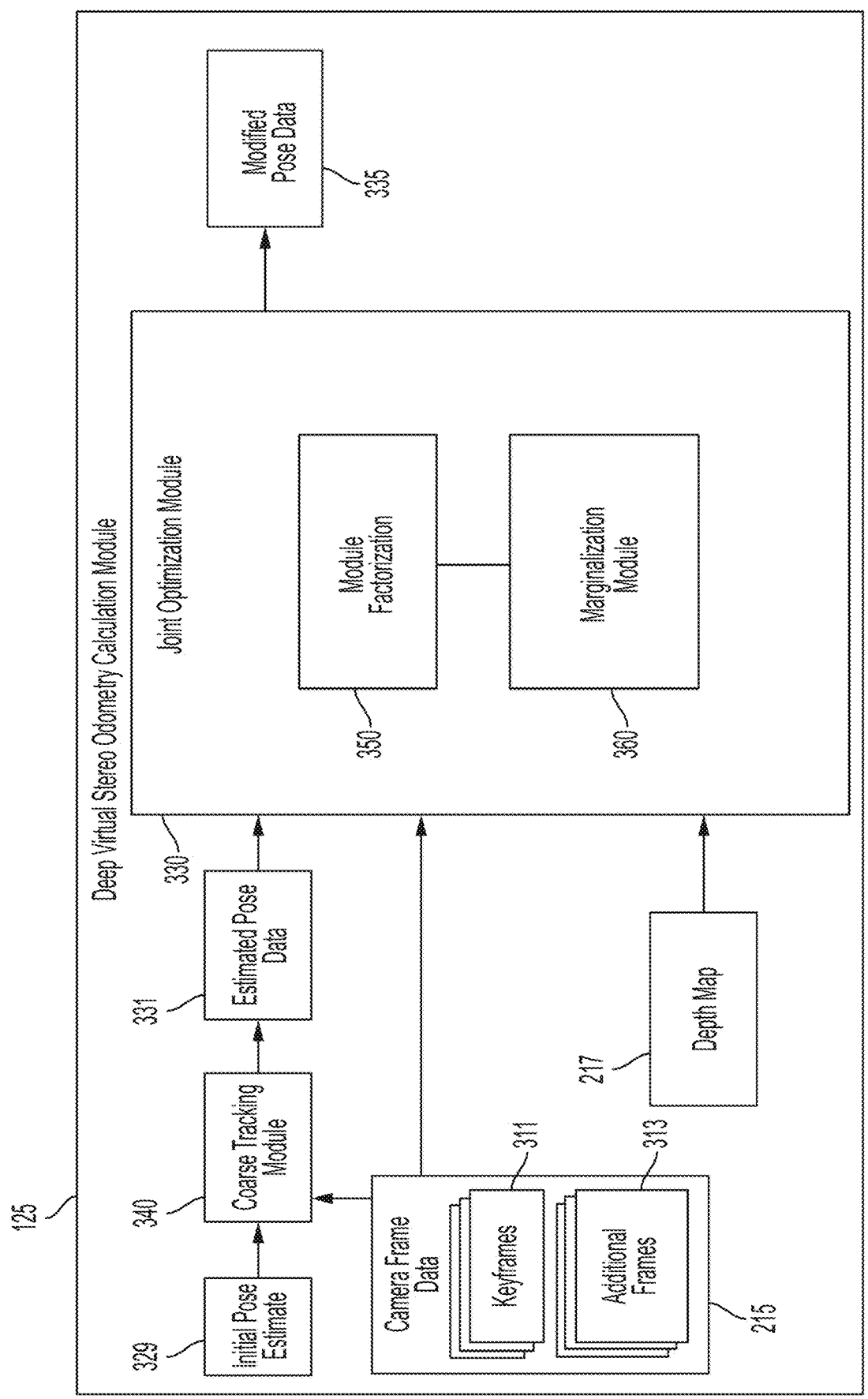
FIG. 3 is a diagram depicting an example of a deep virtual stereo odometry calculation module with a joint optimization module, according to certain implementations.

FIG. 3 depicts an example of a deep virtual stereo odometry calculation module 125 that includes a joint optimization module 330. The deep virtual stereo odometry calculation module 125 may be included in a monocular visual odometry system, such as the monocular visual odometry system 110 described above with regard to FIG. 1. In addition, the deep virtual stereo odometry calculation module 125 may receive data (e.g., as described above with regard to FIG. 1), such as camera frame data 215 received by the camera sensor 105. In some cases, the camera frame data 215 may include one or more groups of camera frames, such as a group of keyframes 311 and a group of additional camera frames 313. Based on the received data, the joint optimization module 330 may modify pose data. For example, the joint optimization module 330 may modify coarse tracking associated with pose data based on the camera frame data 215, including the keyframes 311 and the additional frames 313.

In some implementations, a coarse tracking module 340 that is included in the deep virtual stereo odometry calculation module 125 is able to adjust pose data based on one or more camera frames in the camera frame data 215. For example, the coarse tracking module 340 may receive an initial pose estimate 329, such as pose data that includes a current estimation of the monocular visual odometry system's position and location based on the camera frame data 215 (e.g., a set of image points extracted from camera images). The initial pose estimate 329 may be assigned based on a motion model of the camera sensor 105. The assignment of the estimated pose data 331 may be performed by assuming camera motion between a most recent time step t−1 and a current time step t is the same as between a time step t−2 and the most recent time step t−1. In addition, the coarse tracking module 340 may receive a current camera frame (e.g., having a timestamp indicating a recent time of recording by a camera sensor), and a current keyframe from the group of keyframes 311 (e.g., having the most recent timestamp from the group of keyframes 311).

The current keyframe, and each new keyframe 311 provided to the joint optimization module 330, may be initialized with the depth map 217 generated by the stacked architecture module 200 and associated with the time stamps of the keyframes. The coarse tracking module 340 may perform a comparison between the current camera frame and the current keyframe, such as a comparison based on a direct image alignment technique. In some cases, the deep virtual stereo odometry calculation module 125 assigns the current camera frame a status as a keyframe, such as an additional keyframe included in the group of keyframes 311. For example, a current camera frame that includes a high-quality image (e.g., low blur, good illumination, clearly visible image features) may be assigned status as a keyframe. In an additional example, a current camera frame that is sufficiently different from a previous keyframe may be assigned status as a keyframe. In such an example, the new keyframe may be assigned when the camera sensor 115 turns a corner on a street.

Based on the comparison, the coarse tracking module 340 may determine an adjustment to the initial pose estimate 329 to generate the estimated pose data 331. The adjustment may indicate a change in the position or orientation of the monocular visual odometry system, based on one or more visual differences detected between the current camera frame and the current keyframe, such as a difference between extracted points. In addition, the adjustment determined by the coarse tracking module 340 may be based on a given type of data, such as the camera frame data 215. In some cases, the joint optimization module 330 may generate modified pose data 335 based on the estimated pose data 331 determined by the coarse tracking module 340.

In some implementations, the joint optimization module 330 may perform a joint optimization of energy functions of pose data and image depths of sampled points jointly. For example, a factorization module 350 that is included in the joint optimization module 330 may receive the estimated pose data 331, some or all of the camera frame data 215 (such as the keyframes 311), and data associated with the depth map 217. The factorization module 350 may determine a joint optimization of energy functions associated with the estimated pose data 331 and the image depths of the depth map 217.

In some implementations, the joint optimization module 330 includes a marginalization module 360. In an example, the marginalization module 360 removes old keyframes 311 from the deep virtual stereo odometry calculation module 125 by marginalization. The removal of the old keyframes 311 maintains a fixed size of an active processing window for the deep virtual stereo odometry calculation module 125. Additionally, parameter estimates (e.g., camera poses and depths in a marginalization prior factor) outside of the active window may also incorporated into the joint optimization module 330.

Based on the joint optimization of the estimated pose data 331, the factorization module 350 may determine a bundle adjustment to the estimated pose data 331. The bundle adjustment may indicate a change in the position or orientation of the monocular visual odometry system 110 based on one or more differences in visual data. In some examples, the joint optimization module 330 may generate modified pose data 335 based on the bundle adjustment determined by the factorization module 350. The modifications may include a joint optimization, such as a joint optimization that optimizes the estimated pose data 331 (e.g., in a given set of operations by the factorization module 350).

In some implementations, one or more of a joint optimization or a coarse tracking pose adjustment are performed in an ongoing manner. For example, the coarse tracking module 340 may determine a pose adjustment for each camera frame that is included in the camera frame data 215. As images are recorded by the camera sensor 115, the images may be added to the camera frame data 215 as additional camera frames (e.g., included in the additional frames 313). The coarse tracking module 340 may determine a respective pose adjustment for each added image, and generate (or modify) the modified pose data 335 based on the respective adjustments. In addition, the estimated pose data 331 may be updated based on the modified pose data 335, such that the estimated pose data 331 is kept current based on a joint optimization pose adjustment as images are added to the camera frame data 215.

In some cases, a camera frame in the additional frames 313 is assigned status as a keyframe in the keyframes 311. For example, an additional camera frame that is determined to have high quality or that is determined to exceed a difference threshold of a previous keyframe (e.g., by the deep virtual stereo odometry calculation module 125) may be moved to the group of keyframes 311 as an additional keyframe. Responsive to a determination that an additional keyframe has been added, the factorization module 350 may determine a joint optimization based on the additional keyframe. The factorization module 350 may determine a respective joint optimization responsive to each added keyframe, and generate (or modify) the modified pose data 335 based on the respective joint optimization. In addition, the estimated pose data 331 may be updated based on the modified pose data 335 such that the estimated pose data 331 is kept current based on a joint optimization as additional keyframes are added to the camera frame data 215.

In some implementations, a monocular visual odometry system is considered a deep virtual stereo odometry system. The deep virtual stereo odometry system may include (or be configured to communicate with) one or more of a deep virtual stereo odometry calculation module and a camera sensor. In addition, the deep virtual stereo odometry system may determine one or more positional parameters based on pose data determined from the camera sensor. In some cases, the deep virtual stereo odometry system may determine the pose data based on a minimized energy function that includes a photometric error. For example, the pose data may be determined based on the photometric error of a set of points, such as changes in the position of the point between camera frames. In some cases, the deep virtual stereo odometry system may determine the positional parameters based on the pose data (or changes to the pose data) that are indicated by the photometric error.

Figure 4:
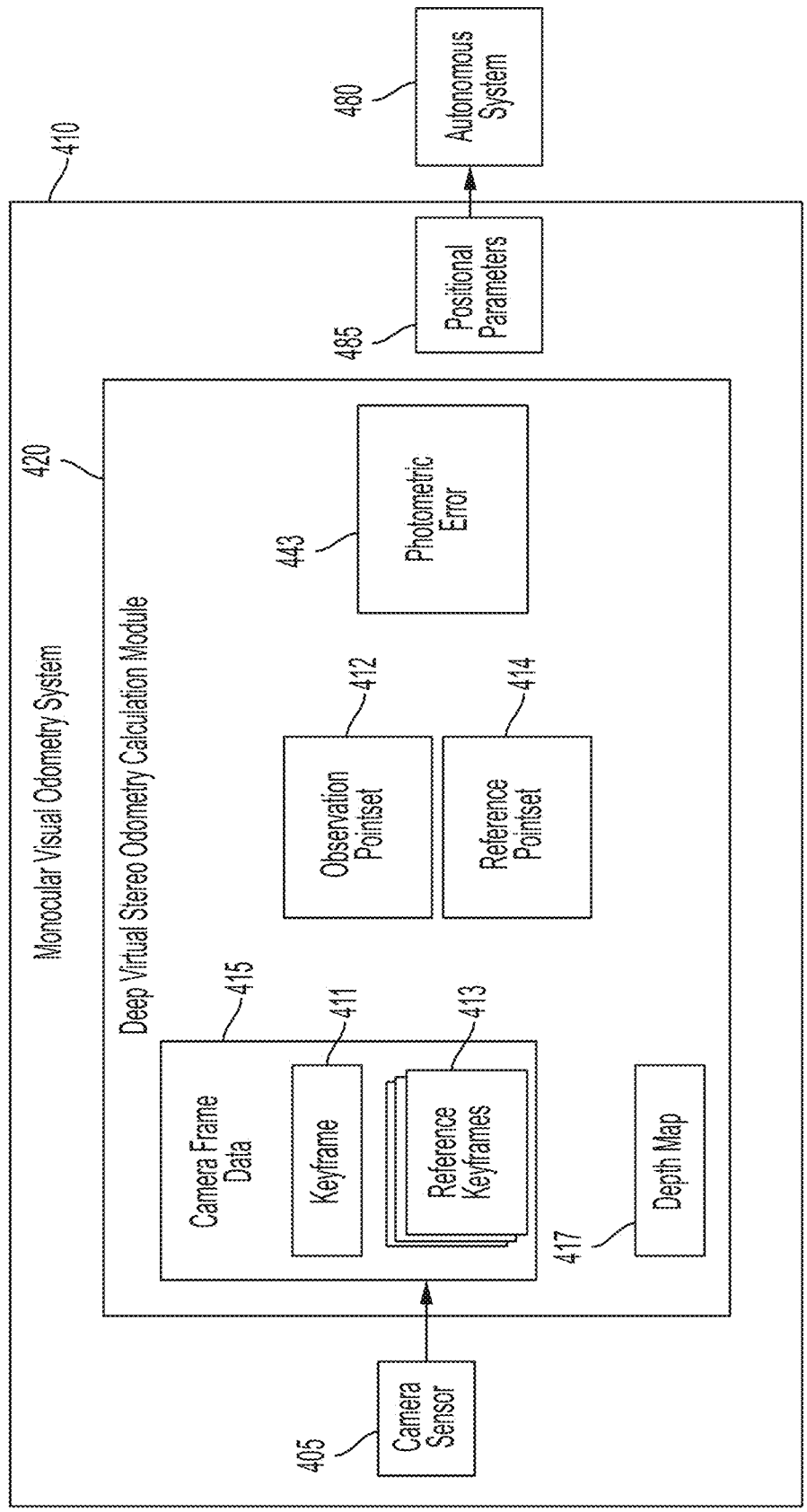
FIG. 4 is a diagram depicting an example of a monocular visual odometry system that includes a deep virtual stereo odometry calculation module and a camera sensor, according to certain implementations.

FIG. 4 depicts an example of a monocular visual odometry system 410 that includes a deep virtual stereo odometry calculation module 420 and a camera sensor 405. The monocular visual odometry system 410 may be considered a deep virtual stereo odometry system (e.g., a monocular visual odometry system including the deep virtual stereo odometry calculation module 420 and the camera sensor 405). In some cases, the monocular visual odometry system 410 may include one or more of a joint optimization module, a coarse tracking module, a factorization module, or a marginalization module (such as described above with regard to FIG. 3), and these modules may perform one or more techniques described with regard to FIG. 4. The monocular visual odometry system 410 may determine one or more positional parameters 485. Determining the positional parameters 485 may include generating a photometric error 443 and calculating a minimized energy function based on the photometric error 443. In addition, the monocular visual odometry system 410 may provide one or more of the positional parameters 485 to an autonomous system, such as an autonomous system 480.

In FIG. 4, the deep virtual stereo odometry calculation module 420 may receive data recorded by the camera sensor 405, such as camera frame data 415. The camera frame data 415 may include a group of one or more camera frames, such as a keyframe 411 or an additional frame 413, that include respective images and corresponding timestamps. In some cases, the deep virtual stereo odometry calculation module 420 may receive the keyframe 411 and a corresponding keyframe timestamp. Based on the corresponding keyframe timestamp, the deep virtual stereo odometry calculation module 420 may determine that the keyframe 411 is a current keyframe that is included in the camera frame data 415 (e.g., the keyframe timestamp is closer to a current time than other timestamps of other keyframes). For example, the keyframe 411 may be a recently added keyframe, such as a camera frame that has had its status change to a keyframe. In some cases, responsive to determining that the keyframe 411 is the current keyframe, the deep virtual stereo odometry calculation module 420 may generate or modify pose data and geometry data based on the keyframe 411.

The deep virtual stereo odometry calculation module 420 may also receive a depth map 417 of the camera frame data 415. As discussed above with respect to FIG. 2, the depth map 417 may be generated by the stacked architecture 200. The depth map 417 may be represented as predicted disparity maps between stereo images. Here, the disparity maps represent the disparity (i.e., apparent pixel differences) between the reconstructed right image 226 (i.e., $I_{recons}^{right}$) and the left reconstructed image 224 (i.e., $I_{recons}^{left}$). Each of the new keyframes 411 added to the deep virtual stereo odometry calculation module 420 includes the depth map 417 that is initialized based on the predicted left disparity and the predicted right disparity generated based on the original image 222 (i.e., $I^{left}$), as identified by the stacked architecture 200. The predicted left disparity may be represented as $D^L$ and the predicted right disparity may be represented as $D^R$ at scale 0. In the deep virtual stereo odometry calculation module 420, the left disparity map $D^L$ is used as an initialization depth value instead of randomly initializing the depth. By using $D^L$ for initialization, scale drift associated with monocular odometry is largely avoided or minimized.

A disparity value of an image point with a coordinate p may be converted to an inverse depth $d_p$ using rectified camera intrinsics and a stereo baseline of the training data of the stacked architecture 200. In an example, the inverse depth $d_p$ may be represented by the following equation:

$$d_p = \frac{D^L(p)}{f_x b} \quad \text{(Equation 10)}$$

where b is a baseline between two cameras of a stereo camera setup, and $f_x$ is a focal length of the camera sensor 105. More specifically, assuming each pixel is has a width x and a height y in meters, then $f_x$ is calculated by dividing a focal length in meters by the width x of the pixel in meters.

The deep virtual stereo odometry calculation module 420 may extract from the keyframe 411 a set of observation points, such as an observation pointset 412, that indicate image features visible in the keyframe 411. Non-limiting examples of image features may include edges, surfaces, shadows, colors, or other visual qualities of objects depicted in an image. In some cases, the observation pointset 412 is a sparse set of points. For example, the observation pointset 412 may include a relatively small quantity of points compared to a quantity of points that are available for extraction, such as a sparse set of approximately 100-600 extracted points for the keyframe 411, from an image having tens of thousands of points available for extraction. The observation pointset 412 may be selected by introducing a left-right consistency check to filter out pixels which likely lie in an occluded area between the left image and a reconstructed right image. For example, the left-right consistency check may be represented by the following equation:

$$e_{lr} = |D^L(p) - D^R(p')| \text{ with } p' = p - [D^L(p)0]^T \quad \text{(Equation 11)}$$

In an example, pixels with a left-right consistency check error (i.e., $e_{lr}$) greater than one may not be selected, as the likelihood of those pixels falling in the occluded area is too significant.

In addition, the deep virtual stereo odometry calculation module 420 may receive at least one reference camera frame from the camera frame data 415, such as the reference keyframes 413. The reference keyframes 413 may include one or more reference images and respective corresponding timestamps, such as an image that has been recorded prior to the keyframe timestamp of the keyframe 411. The deep virtual stereo odometry calculation module 420 may extract from the reference keyframes 413 a set of reference points, such as a reference pointset 414, that indicate image features visible in the reference keyframes 413. The reference pointset 414 may be a sparse set of points, such as described above. In addition, the reference pointset 414 may include a sparse set of points for each keyframe included in the reference keyframes 413 (e.g., approximately 1000-5000 points, based on a combination of approximately 100-600 respective points for each respective reference keyframe in a group of about eight reference keyframes). In some cases, pose data may be based on one or both of the observation or reference pointsets 412 or 414. For example, the estimated or modified pose data 331 or 335 may describe poses based on extracted points (such as points from the pointsets 412 or 414).

Each new frame provided by the camera frame data 415 may be tracked with respect to the reference keyframes 413 using direct image alignment in a coarse-to-fine manner. After this comparison, the deep virtual stereo odometry calculation module 420 decides if a new keyframe 411 should be created for the newly added frame. When a new keyframe 411 is added, a total energy function (i.e., including a temporal multi-view energy function and a virtual stereo energy function) is optimized. The temporal multi-view energy function may be represented by the following equation:

$$E_{photo} := \Sigma_{i \in \mathcal{F}} \Sigma_{p \in \mathcal{P}_i} \Sigma_{j \in obs(p)} E_{ij}^p \qquad \text{(Equation 12)}$$

where $\mathcal{F}$ is a fixed-sized window containing active keyframes such as the keyframe 411 and the reference keyframes 413, $\mathcal{P}_i$ is a set of points selected from a host keyframe with an index i (i.e., the observation pointset 312 and the reference pointset 314), and j∈obs(p) is an index of the keyframes (e.g., the keyframe 411 and the reference keyframes 313) that observes the point p. Further, $E_{ij}^p$ is a photometric error 443 of the point p when projected from a host keyframe (e.g., the keyframe 311) onto another keyframe (e.g., the reference keyframes 413). The photometric error may be represented by the following equation:

$$E_{ij}^p := \omega_p \left\| (I_j[\tilde{p}] - b_j) - \frac{e^{a_j}}{e^{a_i}} (I_i[p] - b_i) \right\|_\gamma \qquad \text{(Equation 13)}$$

where the point p is included in a first image $I_i$. Parameters $a_i$, $a_j$, $b_i$, and $b_j$ are used for modeling an affine brightness transformation, and a weight $\omega_p$ penalizes points with high image gradient with an intuition that an error originating from bilinear interpolation of discrete image values is larger. The $\|\cdot\|_\gamma$ is the Huber norm with a threshold γ. A difference of an intensity of the point p is determined between the first image $I_i$ (e.g., from the keyframe 311) and a second image $I_j$ (e.g., from a keyframe in the reference keyframes 413). The point $\tilde{p}$ is a projected image coordinate using a relative rotation matrix R∈SO(3) and translation vector t∈$\mathbb{R}^3$. The point $\tilde{p}$ may be represented by the following equation:

$$\tilde{p} = \Pi_c(R\Pi_c^{-1}(p,d_p)+t) \qquad \text{(Equation 14)}$$

where $\Pi_c$ and $\Pi_c^{-1}$ are camera projection and back-projection functions.

The deep virtual stereo odometry calculation module 420 may determine the photometric error 443 based on the observation pointset 412 and reference pointset 414. For example, the deep virtual stereo odometry calculation module 420 may compare an observed intensity of one or more points in the observation pointset 412 to a reference intensity of one or more corresponding points in the reference pointset 414. The photometric error 443 may be based on a combination of the compared intensities, as described above in Equation 12.

To further improve the accuracy of the photometric error 443, a virtual stereo photometric term $E^{\dagger p}$ is introduced for each point p. The virtual stereo photometric term may be represented by the following equation:

$$E_i^{\dagger p} := \omega_p \|I_i^\dagger[p^\dagger] - I_i[p]\|_\gamma \text{ with } I_i^\dagger[p^\dagger] = I_i[p^\dagger - [D^R(p^\dagger)0]^T] \qquad \text{(Equation 15)}$$

where $p^\dagger = \Pi_c(\Pi_c^{-1}(p,d_p)+t_b)$ is a virtual projected coordinate of p using a vector $t_b$ denoting a virtual stereo baseline that is obtained from training the stacked architecture 200. The virtual stereo photometric term $E^{\dagger p}$ may optimize an estimated depth of the visual odometry to become consistent with the disparity prediction (e.g., the depth map 217) generated by the stacked architecture 200. Instead of imposing consistency directly on estimated and predicted disparities, residuals are formulated in photoconsistency to reflect uncertainties of the prediction of the stacked architecture 200 and to keep a unit of the residuals consistent with temporal direct image alignment terms.

The energy may then be optimized using the following equation:

$$E_{photo} := \Sigma_{i \in \mathcal{F}} \Sigma_{p \in \mathcal{P}_i} (\lambda E_i^{\dagger p} + \Sigma_{j \in obs(p)} E_{ij}^p) \qquad \text{(Equation 16)}$$

where a coupling factor λ balances the temporal term and the virtual stereo photometric term. Based on the photometric error 443, the deep virtual stereo odometry calculation module 420 may calculate a minimized energy function. For example, all of the parameters of the total energy may be jointly optimized using the Gauss-Newton method.

In some implementations, pose data, such as the modified pose data 335, may be modified based on the photometric error 443. In some cases, the monocular visual odometry system 410 may generate (or modify) the positional parameters 485 based on the minimized values of the photometric error 443. The positional parameters 485 may be provided to the autonomous system 480.

Figure 5:
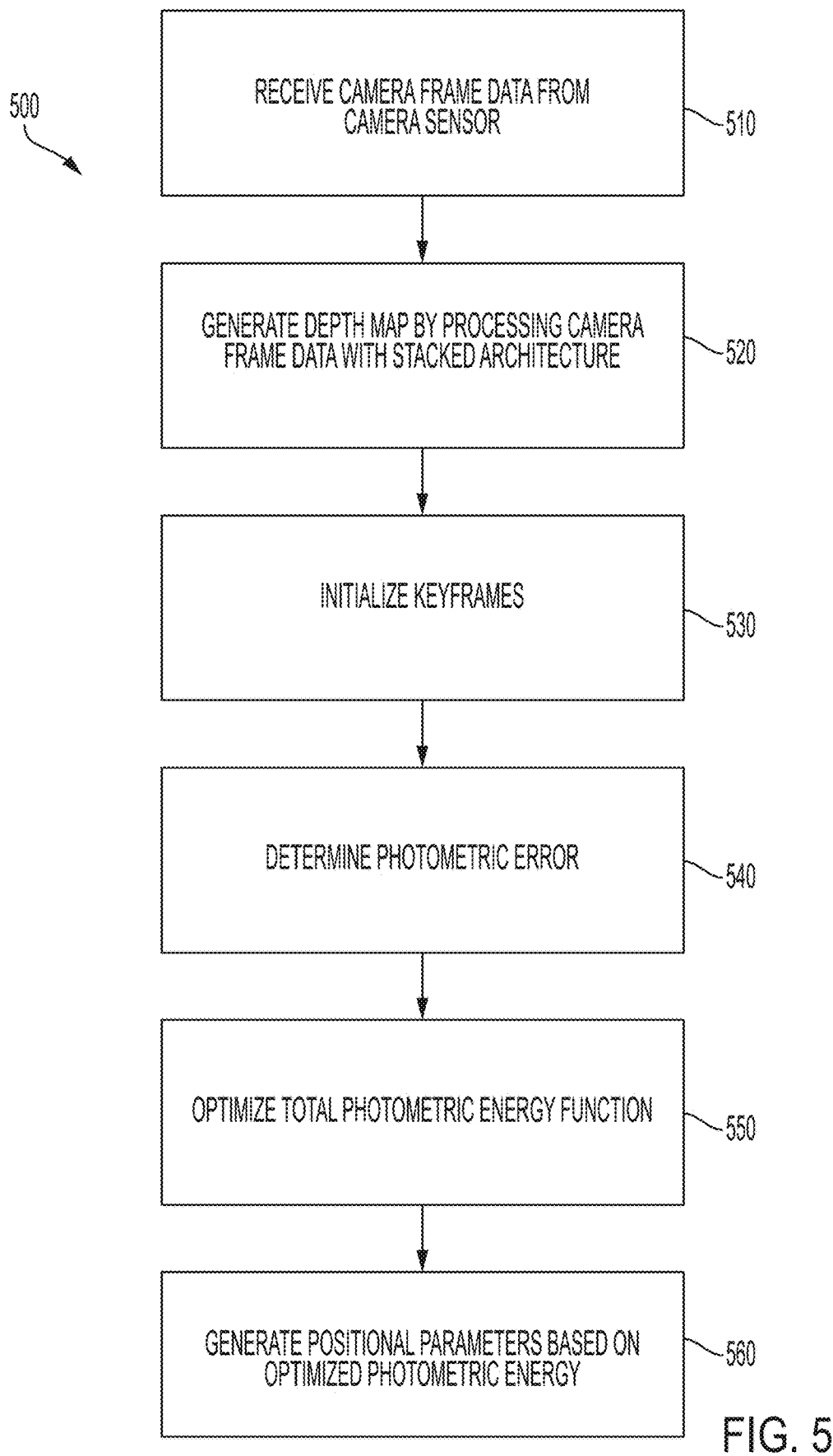
FIG. 5 is a flow chart depicting an example of a process for determining positional parameters, according to certain implementations.

FIG. 5 is a flow chart depicting an example of a process 500 for determining positional parameters based on a photometric error. In some implementations, such as described in regard to FIGS. 1-4, a computing device executing a deep virtual stereo odometry system implements operations described in FIG. 5, by executing suitable program code. For illustrative purposes, the process 500 is described with reference to the examples depicted in FIGS. 1-4. Other implementations, however, are possible.

At block 510, the process 500 involves receiving the camera frame data 215 from the camera sensor 105. The camera frame data may include the keyframes 211, additional frames 213, or any other data obtained by the camera sensor 105. In an example, the camera sensor 105 is an individual camera, and the camera frame data 215 is monocular camera data.

At block 520, the process 500 involves generating the depth map 217 by processing the camera frame data with the stacked architecture 200. As discussed above with respect to FIG. 2, the stacked architecture 200 includes the encoder-decoder architecture 202 and the residual encoder-decoder architecture 204. The camera frame data 215 is processed by the encoder-decoder architecture 202 and the residual encoder-decoder architecture 204 to generate the depth map 217. In an example, the depth map 217 may represent a predicted left disparity $D^L$ and a predicted right disparity $D^R$.

At block 530, the process 500 involves initializing keyframes using the depth map 217. Initially, the deep virtual stereo odometry calculation module 125 determines which data of the camera frame data 215 represents a new keyframe 311. Upon identifying the new keyframe 311, the deep virtual stereo odometry calculation module 125 initializes depth maps of the new keyframes 311 using the predicted left disparity $D^L$ and the predicted right disparity $D^R$ predicted by the stacked architecture module 200.

At block 540, the process 500 involves determining a photometric error based on a set of observation points extracted from the keyframe 311 and a set of reference points extracted from reference camera frames. In some cases, the set of observation points and the set of reference points may each be a sparse set of points, such as the observation pointset 412 and the reference pointset 414. In some implementations, the photometric error is based on a comparative intensity of one or more observation points as compared to respective reference points. For example, the deep virtual stereo odometry calculation module 420 may determine the photometric error 443 based on a comparison of each observation point in the observation pointset 412 to a respective corresponding reference point in the reference pointset 414.

At block 550, the process 500 involves optimizing a total photometric energy function using the photometric error. In an example, the total photometric energy function may include the photometric error 443 and a virtual stereo photometric term, as discussed above with respect to FIG. 4. The total photometric energy may be jointly optimized using the Gauss Newton method. Other energy optimization techniques are also contemplated.

At block 560, the process 500 involves generating positional parameters of the monocular visual odometry system 110 based on the optimized photometric energy. For example, the monocular visual odometry system 410 may generate the positional parameters 485 based on the photometric error 443 after the photometric energy function is optimized. In some cases, the positional parameters are provided to an autonomous system, such as to the autonomous system 480, and are used to control operation of the autonomous system 480 (e.g., steering, navigating, etc.).

In some implementations, one or more operations in the process 500 are repeated. For example, some or all of the process 500 may be repeated based on additional camera frame data being received (or generated) by the monocular visual odometry system. In some cases, the deep virtual stereo odometry calculation module may perform additional comparisons of modified observation and reference pointsets, such as ongoing calculations of the photometric errors based on additional camera frame data.

Figure 6:
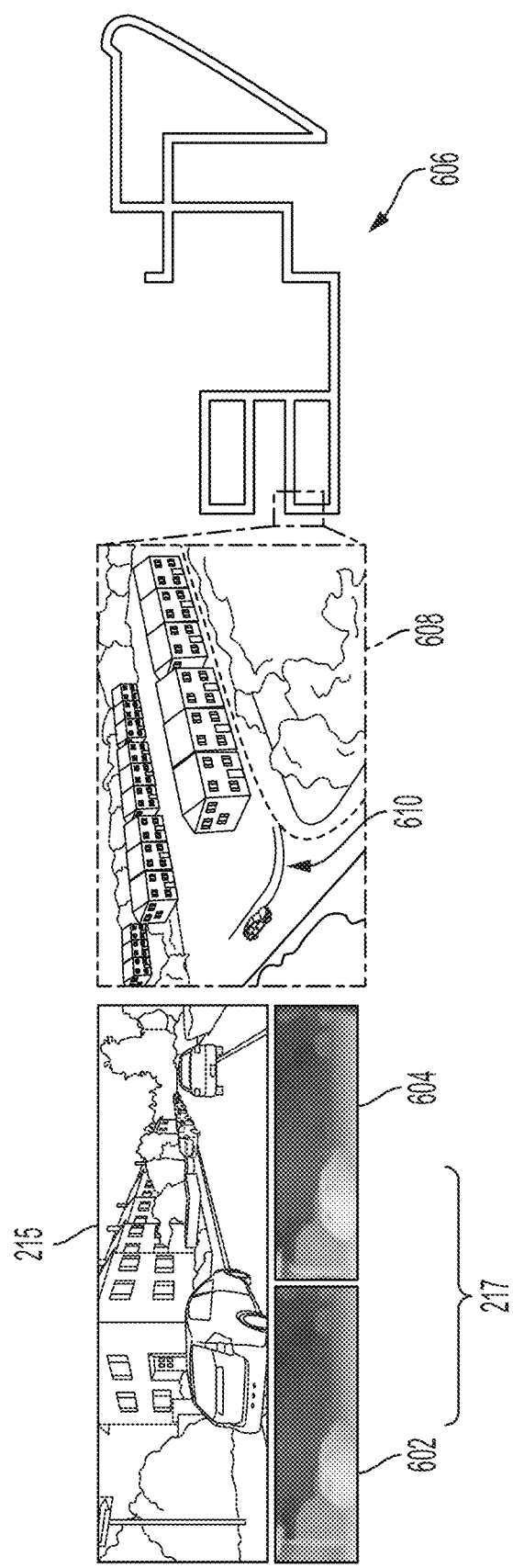
FIG. 6 is an example of left-right disparity predictions used in the deep virtual stereo odometry calculation module to generate an estimated trajectory, according to certain implementations.

FIG. 6 is an example of left-right disparity predictions used in the deep virtual stereo odometry calculation module 125 to generate an estimated trajectory. The camera frame data 215 provided to the stacked architecture module 200 to generate the depth map 217 is depicted in FIG. 6 as a monocular camera image. The depth map 217 generated by the stacked architecture module 200 includes a predicted left disparity map 602 and a predicted right disparity map 604.

By initializing the new keyframes 311 in the deep virtual stereo odometry calculation module 125 with the predicted left disparity map 602 and the predicted right disparity map 604, scale drift is avoided as the monocular visual odometry system 110 moves, for example, along a city street. Thus, the monocular visual odometry system 110 can accurately plot a location of the monocular visual odometry system 110 based on the monocular images received from the camera sensor 105. The location plotting is demonstrated by an estimated trajectory 606 of the monocular visual odometry system 110 that is generated as the monocular visual odometry system 110 moves. As depicted by image 608, the estimated trajectory 606 may be representative of the path of the monocular visual odometry system 110 through a street 610 within a city. In an example, the autonomous system 480, described above with respect to FIG. 4, may use the estimated trajectory 606 to control operation of a self-driving car.

Figure 7:
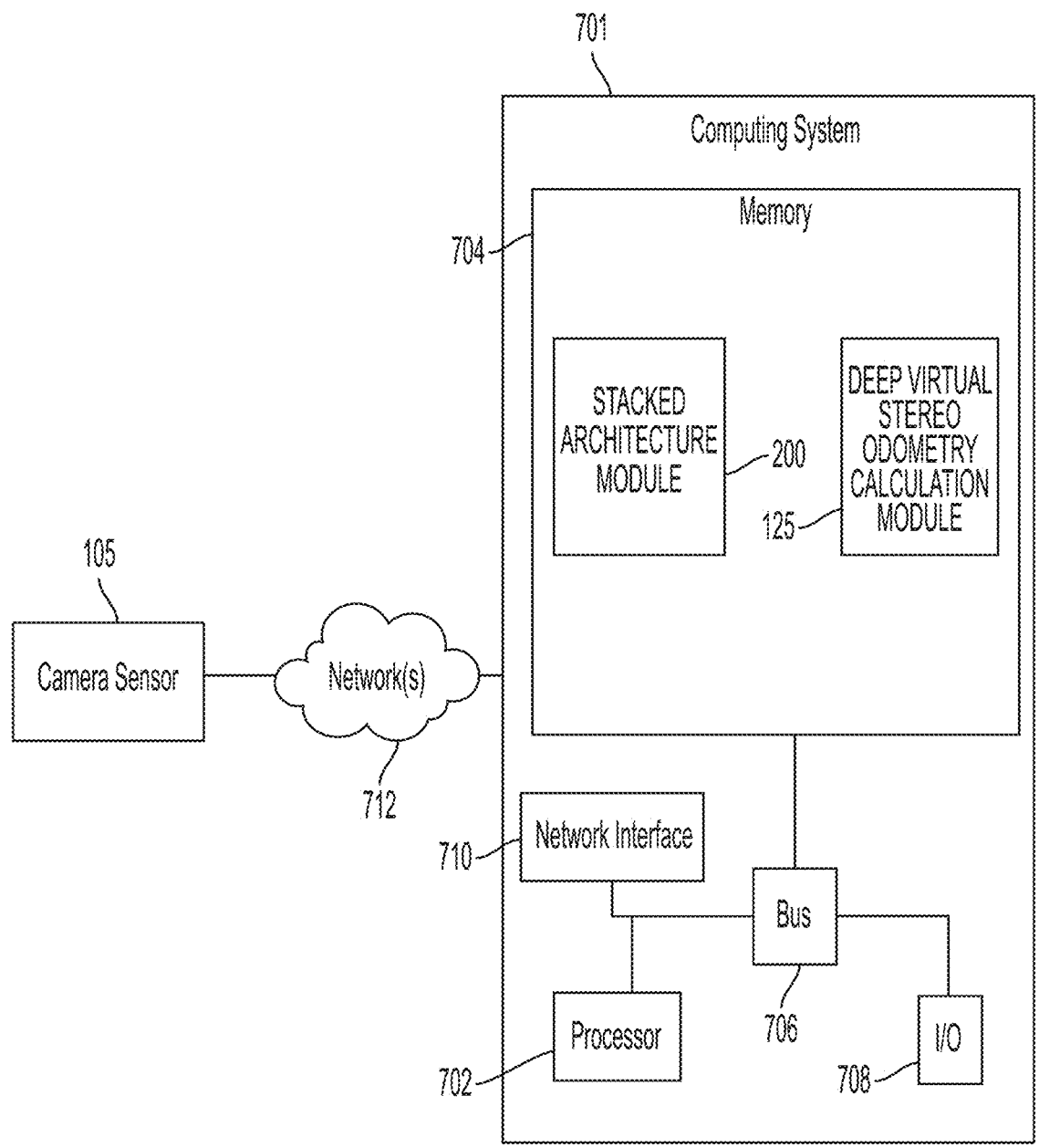
FIG. 7 is a block diagram depicting an example of a computing system for implementing a monocular visual odometry system, according to certain implementations.

Any suitable computing system or group of computing systems can be used for performing the operations described herein. For example, FIG. 7 is a block diagram depicting a computing system 701 that is configured as a monocular visual odometry system, according to certain implementations.

The depicted example of a computing system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the deep virtual stereo odometry calculation module 125, the stacked architecture module 200, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 701 may also include a number of external or internal devices such as input or output devices. For example, the computing system 701 is shown with an input/output ("I/O") interface 708 that can receive input from input devices or provide output to output devices. A bus 706 can also be included in the computing system 701. The bus 706 can communicatively couple one or more components of the computing system 701.

The computing system 701 executes program code that configures the processor 702 to perform one or more of the operations described above with respect to FIGS. 1-6. The program code includes operations related to, for example, one or more of the deep virtual stereo odometry calculation module 125, the stacked architecture module 200, or other suitable applications or memory structures that perform one or more operations described herein. The program code may be resident in the memory device 704 or any suitable computer-readable medium and may be executed by the processor 702 or any other suitable processor. In some implementations, the program code described above, the deep virtual stereo odometry calculation module 125, and the stacked architecture module 200, are stored in the memory device 704, as depicted in FIG. 7. In additional or alternative implementations, one or more of the deep virtual stereo odometry calculation module 125, the stacked architecture module 200, and the program code described above are stored in one or more memory devices accessible via a data network, such as a memory device accessible via a cloud service.

The computing system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. In some cases, the computing system 701 is able to communicate with the camera sensor 105 using the network interface 710. Although FIG. 7 depicts the camera sensor 105 as connected to computing system 701 via the networks 712, other implementations are possible, including the camera sensor 105 operating as a component of computing system 701, such as input components connected via I/O interface 708.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A monocular visual odometry system, comprising:
   a stacked architecture module configured to perform operations comprising:
      receiving camera frame data from a monocular camera sensor; and
      generating a depth map of the camera frame data; and
   a deep virtual stereo odometry calculation module configured to perform operations comprising:
      receiving the camera frame data from the monocular camera sensor and the depth map from the stacked architecture module;
      initializing a keyframe of the camera frame data using the depth map of the camera frame data;
      determining a photometric error based on a set of observation points extracted from the keyframe and a set of reference points extracted from a set of reference camera frames of the camera frame data;
      determining a virtual stereo photometric term using the depth map of the camera frame data;
      optimizing a total photometric energy function comprising the photometric error and the virtual stereo photometric term;
      generating a positional parameter of the monocular visual odometry system using the total photometric energy function; and
      providing the positional parameter to an autonomous system.

2. The monocular visual odometry system of claim 1, wherein the stacked architecture module comprises a first encoder-decoder architecture module and a residual encoder-decoder architecture module.

3. The monocular visual odometry system of claim 1, wherein the stacked architecture module is configured to perform operations further comprising:
   generating, by an encoder-decoder neural network, a first disparity map of the camera frame data;
   generating, by a residual encoder-decoder neural network, a residual disparity map of the camera frame data; and
   generating the depth map by combining the first disparity map and the residual disparity map using element-wise summation.

4. The monocular visual odometry system of claim 1, wherein the stacked architecture module is trainable by minimizing a total loss term comprising a self-supervised loss term, a supervised loss term, a left-right consistency loss term, a smoothness term, an occlusion regularization term, or any combination thereof.

5. The monocular visual odometry system of claim 1, further comprising:
   the autonomous system, wherein the autonomous system is controlled using the positional parameter.

6. The monocular visual odometry system of claim 1, wherein the photometric error is based on a comparison of the set of observation points and the set of reference points.

7. A method, comprising:
receiving camera frame data from a monocular camera sensor;
generating a depth map of the camera frame data;
initializing a keyframe of the camera frame data using the depth map of the camera frame data;
determining a photometric error based on a set of observation points extracted from the keyframe and a set of reference points extracted from a set of reference camera frames of the camera frame data;
determining a virtual stereo photometric term using the depth map of the camera frame data;
optimizing a total photometric energy function comprising the photometric error and the virtual stereo photometric term;
generating a positional parameter of the monocular camera sensor using the total photometric energy function; and
providing the positional parameter to an autonomous system.

8. The method of claim 7, further comprising:
controlling operation of the autonomous system using the positional parameter.

9. The method of claim 7, wherein the depth map comprises a left disparity map and a right disparity map.

10. The method of claim 7, wherein the virtual stereo photometric term is generated for each point of the set of observation points.

11. The method of claim 7, wherein the photometric error is based on a comparison of the set of observation points and the set of reference points.

12. The method of claim 7, further comprising:
generating a first disparity map of the camera frame data;
generating a residual disparity map of the camera frame data; and
generating the depth map by combining the first disparity map and the residual disparity map using element-wise summation.

13. A non-transitory computer-readable medium embodying program code for operating a monocular visual odometry system, the program code comprising instructions which, when executed by a processor, cause the processor to perform operations comprising:
receiving camera frame data from a monocular camera sensor;
generating a depth map of the camera frame data;
initializing a keyframe of the camera frame data using the depth map of the camera frame data;
determining a photometric error based on a set of observation points extracted from the keyframe and a set of reference points extracted from a set of reference camera frames of the camera frame data;
determining a virtual stereo photometric term using the depth map of the camera frame data;
optimizing a total photometric energy function comprising the photometric error and the virtual stereo photometric term;
generating a positional parameter of the monocular camera sensor using the total photometric energy function; and
providing the positional parameter to an autonomous system.

14. The non-transitory computer-readable medium of claim 13, wherein the depth map is generated using a stacked architecture module comprising a first encoder-decoder architecture module stacked with a residual encoder-decoder architecture module.

15. The non-transitory computer-readable medium of claim 14, wherein the instructions cause the processor to perform further operations comprising:
training the stacked architecture module by minimizing a total loss term comprising a self-supervised loss term, a supervised loss term, a left-right consistency loss term, a smoothness term, an occlusion regularization term, or any combination thereof.

16. The non-transitory computer-readable medium of claim 13, wherein the instructions cause the processor to perform further operations comprising:
generating a first disparity map of the camera frame data;
generating a residual disparity map of the camera frame data; and
generating the depth map by combining the first disparity map and the residual disparity map using element-wise summation.

17. The non-transitory computer-readable medium of claim 13, wherein the photometric error is based on a comparison of the set of observation points and the set of reference points.

18. The non-transitory computer-readable medium of claim 13, wherein the instructions cause the processor to perform further operations comprising:
controlling operation of the autonomous system using the positional parameter.

19. The non-transitory computer-readable medium of claim 13, wherein the depth map comprises a left disparity map and a right disparity map.

20. The non-transitory computer-readable medium of claim 13, wherein the virtual stereo photometric term comprises a virtual projected coordinate of each observation point of the set of observation points using a vector comprising a virtual stereo baseline.

* * * * *